US008718858B2

(12) United States Patent
Al-Mahnna

(10) Patent No.: US 8,718,858 B2
(45) Date of Patent: May 6, 2014

(54) GPS NAVIGATION SYSTEM

(76) Inventor: Khaled Abdullah M. Al-Mahnna, Salmma (KW)

(*) Notice: Subject to any disclaimer, the term of this patent is extended or adjusted under 35 U.S.C. 154(b) by 87 days.

(21) Appl. No.: 13/073,314

(22) Filed: Mar. 28, 2011

(65) Prior Publication Data
US 2012/0253580 A1  Oct. 4, 2012

(51) Int. Cl.
G05D 1/00 (2006.01)
(52) U.S. Cl.
USPC ............................................................ 701/23
(58) Field of Classification Search
None
See application file for complete search history.

(56) References Cited

U.S. PATENT DOCUMENTS

| | | | |
|---|---|---|---|
| 5,774,069 A | 6/1998 | Tanaka et al. | |
| 5,774,827 A | 6/1998 | Smith, Jr. et al. | |
| 5,906,645 A | 5/1999 | Kagawa et al. | |
| 5,919,246 A | 7/1999 | Waizmann et al. | |
| 6,351,709 B2 | 2/2002 | King et al. | |
| 6,459,961 B1 * | 10/2002 | Obradovich et al. | 701/1 |
| 6,640,164 B1 | 10/2003 | Farwell et al. | |
| 6,684,137 B2 | 1/2004 | Takagi et al. | |
| 2003/0191568 A1 * | 10/2003 | Breed | 701/36 |

* cited by examiner

Primary Examiner — Thomas Tarcza
Assistant Examiner — Garrett Evans
(74) Attorney, Agent, or Firm — Lowe Hauptman & Ham, LLP

(57) ABSTRACT

A GPS navigation system for a motor vehicle mounted within sight of a driver and/or navigator. The system comprises and/or consists of a memory module that contains a pre-stored map database including a plurality of locations and a receiver supported within the motor vehicle for receiving signals indicative of the current position of the map. The system also includes a monitor positioned in the position within sight of the driver and/or navigator for displaying the location of the vehicle with the respect to a pre-stored map. Means including the memory module, receiver and said monitor display an area of about ½ km in all direction and up to ½ km to 1 km from the current position of the vehicle. Further, means including a zoom optical system for zooming in and out of the ½ to 1 km radius of the vehicle location on the stored map and means for summoning help to the present location of the vehicle. In addition, radar means for sensing an object that obstructs the projected pathway of the vehicle and a plurality of sensors and running control means perform the auto-drive control running of the vehicle based on the detection of signals from the plurality of sensors wherein said auto-drive control includes speed control, steering and breaking. The system includes a change over means for switching between the auto-drive and manual drive modes.

1 Claim, 5 Drawing Sheets

GPS NAVIGATION SYSTEM

FIELD OF THE INVENTION

This invention relates to a GPS navigation for a motor vehicle and more particularly to a GPS navigational system for a motor vehicle wherein the system includes a memory module, a receiver, a monitor for displaying an enlarged area and locations of the vehicle on a pre-stored map. The system also includes an auto-drive and manual drive function and the ability to switch from one function to the other.

BACKGROUND FOR THE INVENTION

GPS navigational systems are well known and have been in use for a number of years. For example, a Kagawa et al. U.S. Pat. No. 5,906,645 discloses an auto-drive control unit for vehicles. As disclosed, a unit for smoothly switching from auto-drive to manual drive for a vehicle provided with an auto-drive mode. To perform auto-drive, an auto-drive ECU controls steering wheel, brake, and accelerator actuators in accordance with signals from a route recognition/obstruction check sensor, a GPS and the like. When an interface (switch) for switching to the manual drive is operated, the auto-drive ECU evaluates running stability/instability in accordance with signals from various running safety devices and sensors for detecting a variation in vehicle state and if the vehicle is in an instable state, prohibits a shift to the manual drive, even when the vehicle is run on a straight road.

A vehicle navigation system with a route updating feature is described in a U.S. Pat. No. 6,351,709 of King et al. The King et al. patent discloses a vehicle navigation system that includes an update module that provides travel advisory information on a real time basis. The update module receives traffic advisory signals such as intelligent highway systems, safety warning system signals, and specially encoded traffic reports from radio stations. The travel advisory signals are utilized by the navigation system to provide a route guidance strategy to a driver that is not limited by the information from a pre-stored map database. While traveling, the update module continues to provide information that is utilized to generate an updated route as appropriate. Additionally, the vehicle navigation system preferably includes the ability to generate a beacon signal indicating that the vehicle is in a position or condition that presents a potential traffic hazard to other drivers. The beacon signal from the navigation system of this invention is on example of the kind of travel advisory signal that the inventive navigation system uses to generate an updated route guidance strategy.

Finally, a Farwell et al., U.S. Pat. No. 6,640,164 discloses a method and system for remote control of self-propelled vehicles. As disclosed therein, a method and system for remote control of self-propelled vehicles includes a leader vehicle and at least one follower vehicle located behind the leader vehicle. The leader vehicle traverses a waypoint, determines a first set of GPS coordinates corresponding to the waypoint, and transmits the first set of GPS coordinates to the follower vehicle. The follower vehicle determines a second set of GPS coordinates corresponding to its own position and compares the first set of GPS coordinates to the second set of GPS coordinates. By controlling steering, drive and braking systems of the follower vehicle with a servo-actuator, the follower vehicle is guided toward the waypoint by minimizing the difference between the first and second sets of GPS coordinates. This process is repeated at a succession of waypoints such that the follower vehicle traverses the same course as the leader vehicle.

Notwithstanding the above, it is presently believed that there is a need and a potential commercial market for an improved GPS navigation system in accordance with the present invention. There should be a need and a commercial market for such systems because they provide a monitor that displays the location of a motor vehicle on a pre-stored map and at the option of a user an area of about ½ km around a location of a motor vehicle. The system also includes an auto-drive mode which avoids objects that appear to be an obstruction in the proposed pathway of the vehicle. Such systems should also minimize accidents and avoid unexpected problems along a proposed route. Further, the system provides a vehicle "picture" of an area around the vehicle of about 1 km in diameter. In this way, the user can see all sides, front and rear lateral side in the form of a natural picture in the daytime and in the form of a thermal object through nocturnal photography in the nighttime.

BRIEF SUMMARY OF THE INVENTION

In essence, the present invention contemplates a GPS navigational system for a motor vehicle comprising a memory module that contains a plurality of pre-stored maps in a database. The database includes the plurality of known locations and routes. The system also includes a receiver supported within the vehicle and a monitor with in sight of a driver and/or navigator for displaying a map of the current position of the vehicle on the map. In addition, the system has a means sub-system including the memory module, the receiver and monitor for displaying an expanded area of about ½ km radius in all directions from a current position of the motor vehicle on a map. The system also includes a plurality of sensors and running control means for performing an auto drive control function based on detection of signals from the plurality of sensors as well as change over means for switching between auto drive and manual drive modes.

The invention will now be described in connection with the accompanying drawing wherein like reference numerals have been used to indicate like parts.

DESCRIPTION OF THE PREFERRED EMBODIMENTS OF THE INVENTION

Figure 1:
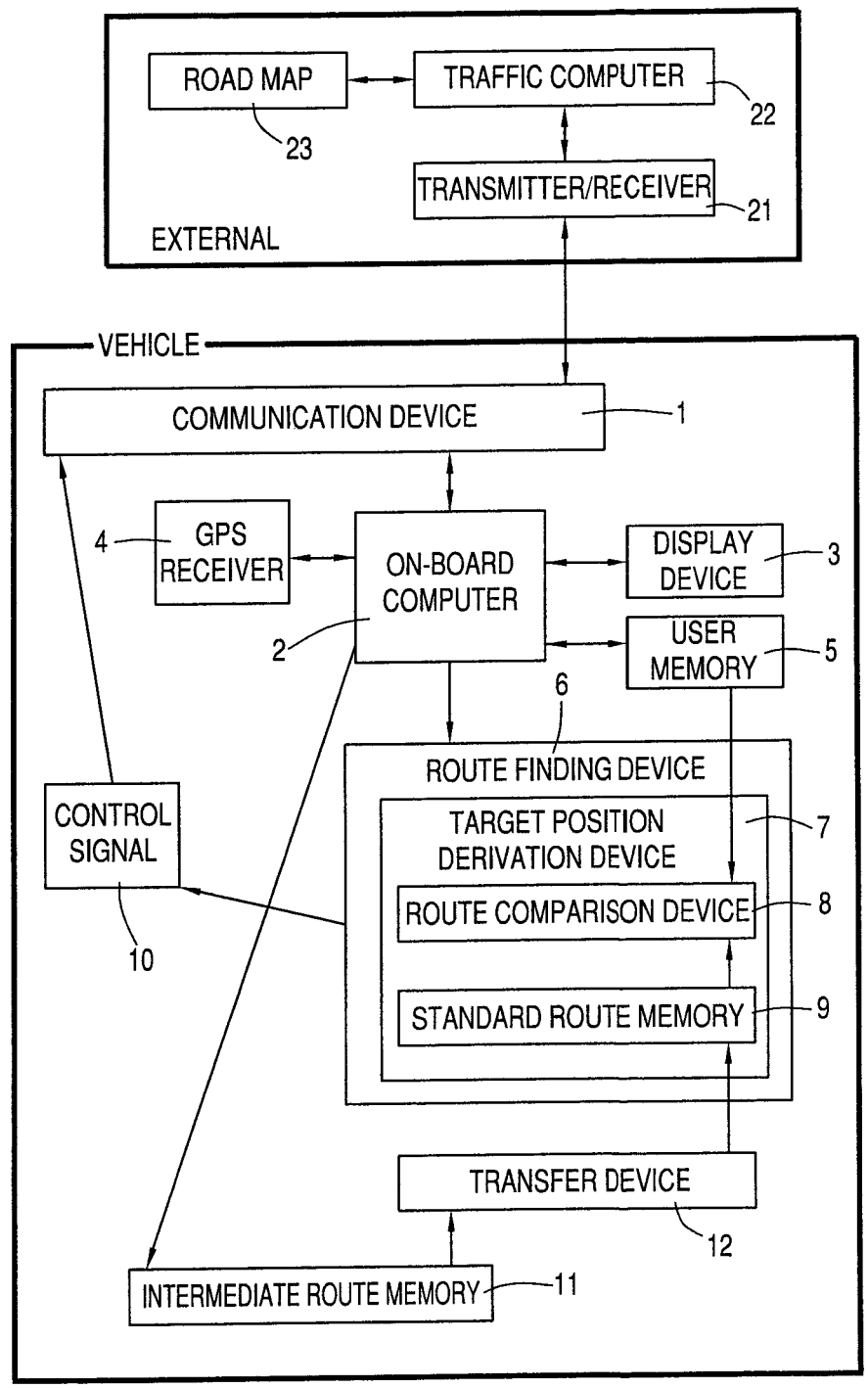
FIG. 1 is a block diagram of a prior art vehicle navigation system.

A prior art navigation system is illustrated in FIG. 1. As illustrated, the vehicle navigation system shown schematically in FIG. 1 comprises an external system unit and a system unit located in the vehicle. The system unit in the vehicle has a communication device 1, by means of which data can be transmitted to the external system unit. The communication device 1 is connected to an on-board computer 2, which is provided in the vehicle and used to control the vehicle-internal devices. Thus, the on-board computer 2 is connected to a display device 3, which displays the travel tips for the driver. The tips can be provided optically and, in addition, acoustically, particularly in the form of a voice output. There is a GPS (Global Positioning System) receiver 4 installed in the vehicle to receive satellite navigation signals for the continuous detection of the current local position of the vehicle. The GPS receiver 4 is connected via the on-board computer 2 to a working memory 5, in which the detected local position data can be stored, together with the corresponding chronological data, especially the time of day at which a trip begins. To derive the current target position and route from the local position data stored in the memory 5 in the form of stored current local positions, there is also a route-finding device 6 that is connected to the on-board computer 2. The route-finding device in turn has a target position derivation device 7. In the illustrated example, the target position derivation device 7 comprises a route comparison device 8, which can access the stored current local positions in the working memory 5 and has typical routes stored in a standard route memory 9. The standard route memory 9 can also be located outside of the vehicle, especially when the standard routes belong to an organized entity, as for example a trucking company. The route comparison device 8 permits the current route to be compared with the routes stored in the standard route memory 9. On the basis, the actual current travel objective (target position) of the vehicle can be predicted. The route finding device 6 is connected to the communication device 1 in such a way that a control signal 10 can cause current travel tips for the route to the current target position to be obtained by the communication device 1.

When a trip ends, the stored current local position can be stored in an intermediate route memory 11, which is connected to the on-board computer 2. The intermediate route memory 11 is connected to the standard route memory 9 by a transverse device 12. The transverse device 12 permits travel routes to be transferred from the intermediate route memory 11 into the standard route memory 9 when the frequency with which a route is traveled during a given past period of time exceeds a certain value, which is pre-established or can be established by the driver. The transfer device 12 thus permits all routes stored in the intermediate route memory 11 to be compared with one another. In this way, the frequency with which a given route occurs in the intermediate route memory 11 can be determined. The route stored in the intermediate route memory 11 preferably includes chronological data, especially the time of day, the day of the week and the month that the travel route in question began. A suitable updating algorithm can be used to update the intermediate route memory 11. The updating algorithm deletes all those routes stored in the intermediate route memory 11 whose times fall outside a predetermined time period.

Further details of the above-identified navigation system are contained in the Waizmann et al., U.S. Pat. No. 5,919,246. The details of which are incorporated herein in their entirety.

An important feature of the present invention resides in an ability to display an expanded area around the present location of the motor vehicle. For example, the system may include a zoom optical system to display an area of about ½ km to up about 1 km of the present location of the vehicle on a map to illustrate possible alternative routes in the event of an accident or other obstruction causing heavy traffic and delays on a chosen route.

In an alternative embodiment, a satellite image of the area around the current location is provided. However, it is not known if public access to such information is presently available.

Figure 2:
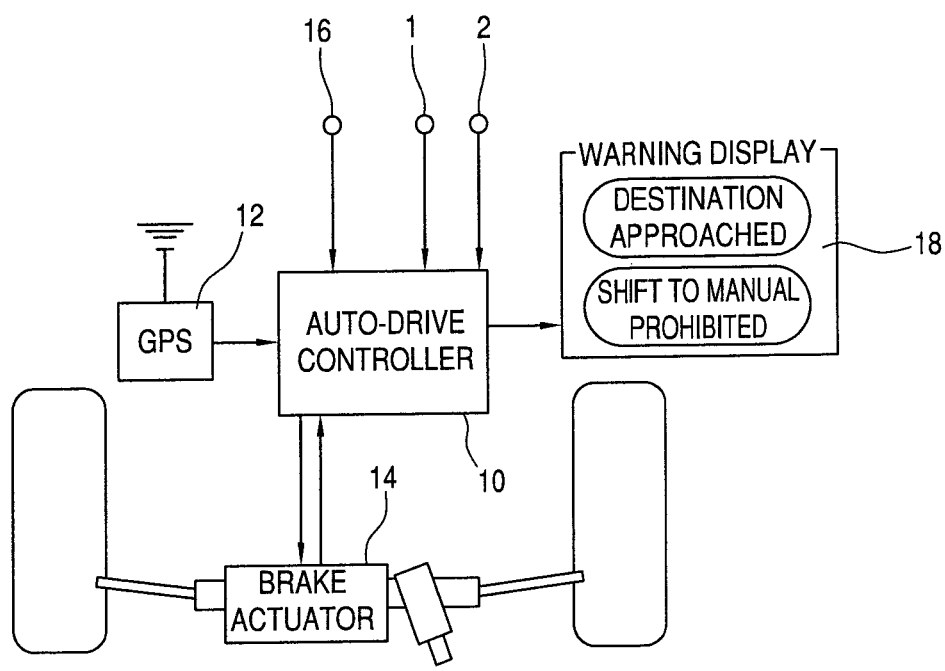
FIG. 2 is a structure block diagram of an auto-drive system as incorporated in the present invention.

The system in accordance with the present invention also incorporates an auto-drive sub-system for use at times of encountering dense fog or heavy dust that reduces visibility on a chosen route. Examples of an auto-drive system that can be incorporated in a combination in accordance with a preferred embodiment of the present invention will now be described in connection with FIGS. 2, 3, and 4. With reference now to FIG. 2, upon receiving information from various sensors such as an obstruction sensor 1 and a vehicle speed sensor 2 and auto-controller 10 drives an auto-drive actuator 14 to effect auto-drive while controlling a vehicles speed and steering. A change-over switch 16 for alternately switching between the auto-drive and the manual drive is provided near the driver's seat and its change over signal is supplied by the auto-drive controller 10. The auto-drive controller 10 also receives a detection signal from a GPS device 12 for detecting the position of an applicable car. The auto-drive controller 10 determines the timing for operating the change over switch 16 according to a pre-determined shift time stored in memory, namely a time required to complete the change over from an auto-drive to manual drive and judges whether or not the applicable car has reached a position where the auto-drive should be switched to the manual drive. A judged result is shown on a warning display 18 provided near the driver's seat, specifically destination approached is displayed as shown in FIG. 1. Also, when it is judged that the shift cannot be completed because the applicable car is positioned where the shift to the manual drive cannot be made in time, it is also shown on the warning display 18, and specifically "SHIFT TO MANUAL DRIVE PROHIBITED" is displayed. In such a case the auto-drive controller 10 activates the actuator 14 to break the vehicle and forces deceleration of the vehicle before a scheduled change over location guides the vehicle to leave the cruising lane into a roadside zone and stops there. Though not shown, it is preferable to combine the above system with a conventional navigation system as previously described.

Figure 3:
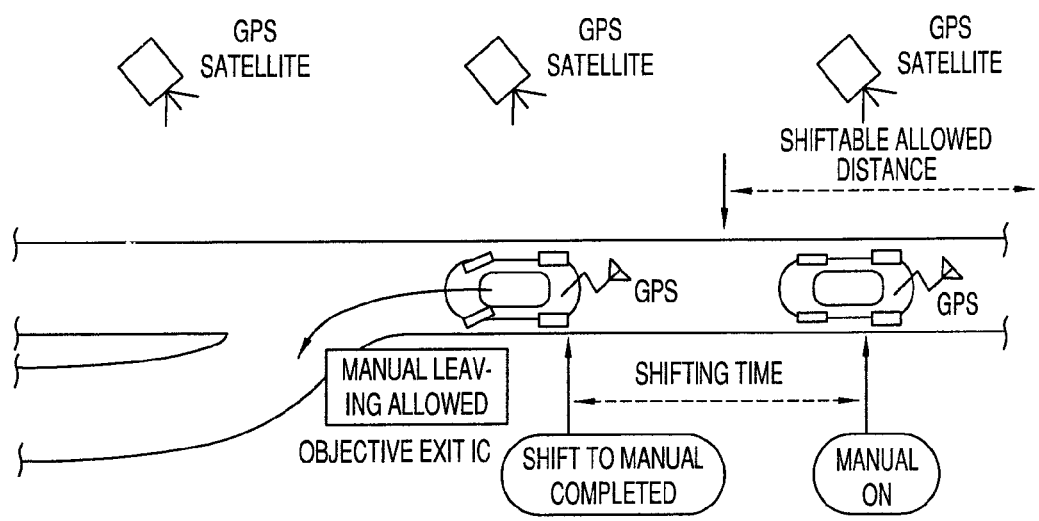
FIG. 3 is a schematic illustration of a display unit as incorporated in the present invention.
Figure 4:
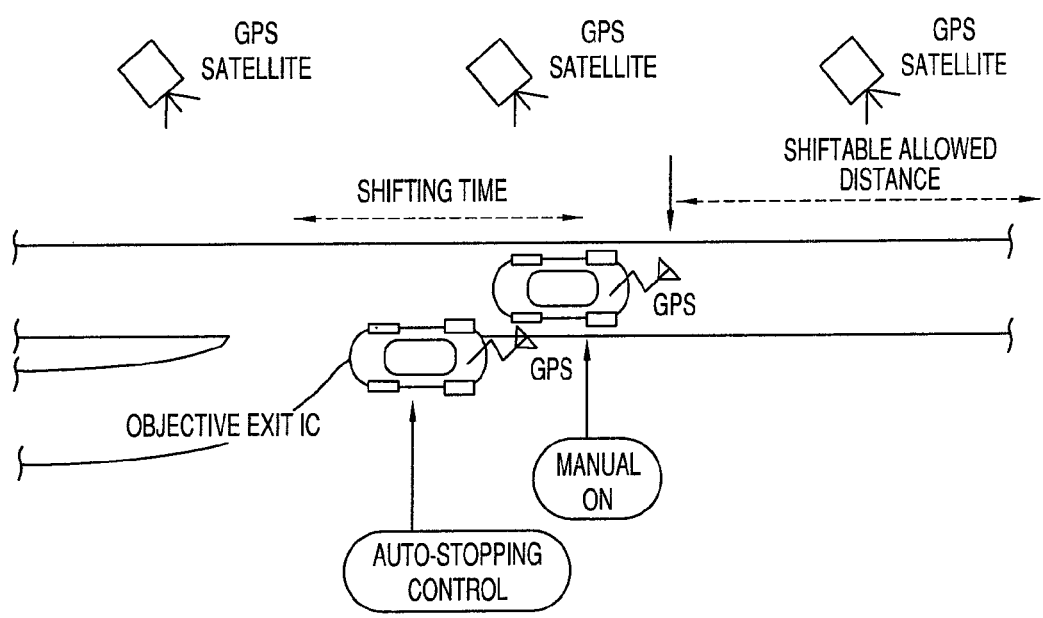
FIG. 4 is a schematic illustration of a change over from auto-control to manual control.

FIGS. 3 and 4 show situations where the change over switch 16 was operated by the driver at an appropriate timing and where timing operating the change over switch was delayed respectively. FIG. 3 show that the change over switch 16 was operated by the drive while the vehicle is running an allowed distance in which the shift could be made. The change over from the auto-drive mode to the manual drive mode could be completed by the system after a prescribed shifting time and the vehicle could enter an objective exit in the manual drive. On the other hand, FIG. 4 shows that the change over switch 16 was operated after the vehicle had left a limited distance in which the shift could be made. The shift from the auto-drive mode to the manual drive mode could not be completed before the vehicle had reached a destination. The controller 10, which had determined such a situation by calculating, forceably decelerated the vehicle to guide to a safety zone before an exit and the vehicle was stopped in a roadside zone.

Figure 5:
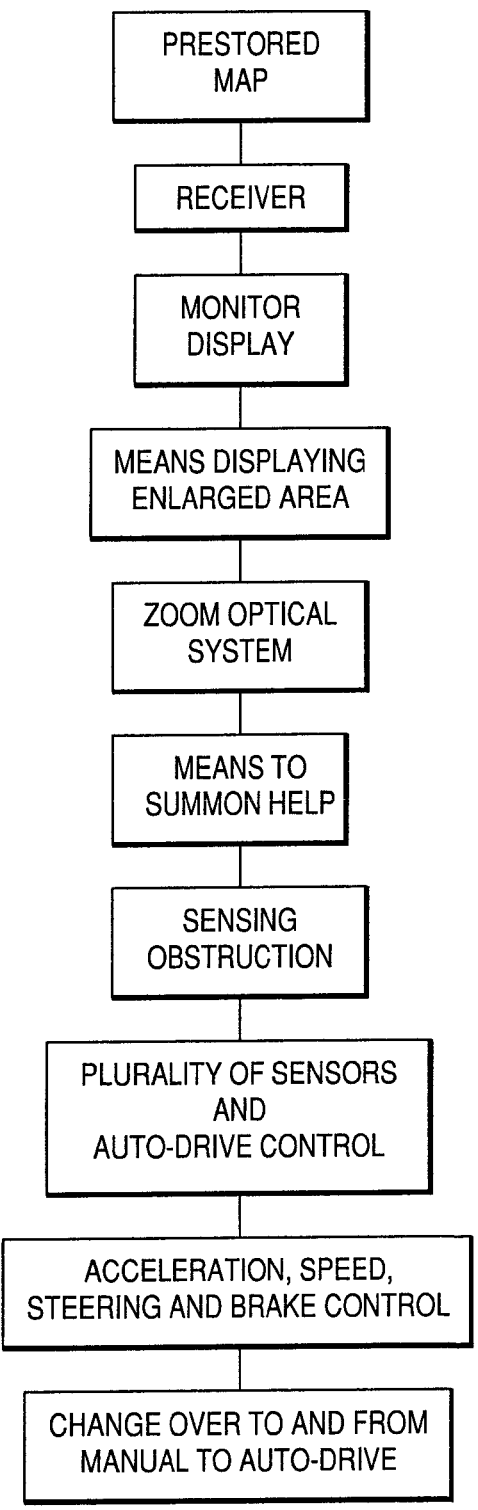
FIG. 5 is a block diagram of a system in accordance with a preferred embodiment of the invention

As illustrated in FIG. 5, a system in accordance with a preferred embodiment of the invention includes a plurality of pre-stored maps stored in a memory module that includes a plurality of known locations and routes supported in the vehicle on or in the vicinity of a dashboard. A receiver supported within the vehicle and with in sight of the driver and/or navigator is indicative of the current position of the vehicle with respect to a stored map of the area.

A monitor is positioned in the vehicle with in sight of the driver and/or navigator for displaying the location of the motor vehicle with respect to the pre-stored map. In addition, means including the memory module, the receiver and the monitor for displaying an area displays an area of about ½ km radius in all directions around the current position of the motor vehicle. Further, means including a zoom optical system for zooming in and out of said ½ km radius of the vehicle location on a stored map is provided together with means for summarizing help to the present location of the vehicle. This means for summarizing help can be any of a plurality of such sub-systems which are currently available in the market place. An important feature of a combination in accordance with the preferred embodiment of the invention resides in a radar means for sensing an object that obstructs the projected pathway of the motor vehicle. Still further, a plurality of sensors and one control means for performing the auto-drive control running of the vehicle based on detection of signals from the plurality of sensors is provided. In the present system the auto-drive control includes speed control, steering and braking and change over means for switching between the auto-drive and the manual drive modes.

While the invention has been described in connection with its preferred embodiment it should be recognized that changes and modifications may be made therein without departing from the scope of the appended claims.

What is claimed is:

1. A GPS navigation system for a motor vehicle mounted within sight of a driver and/or navigator, said system consisting of the combination of:
    a memory module that contains a pre-stored map database that consists of a plurality of known locations, routes stored in memory and chronological data, the time of day, the day of the week and the month that the travel route in question began, a route comparing device with stored current local positions and typical routes stored in memory to permit the current route to be compared with the routes stored in memory, an updating algorithm to update the route memory and wherein the updating algorithm deletes all of the routes stored in memory whose times fall outside of a predetermined time period supported in the vehicle in the vicinity of a dashboard;
    a receiver supported within the vehicle for receiving signals from a GPS navigational system indicative of the current position of the vehicle;
    a monitor positioned in the vehicle within sight of the driver and/or navigator for displaying the location of the vehicle with respect to a pre-stored map;
    means consisting of said memory module, said receiver and said monitor for displaying an area of about ½ km up to about 1 km in all directions from a current position of the vehicle to illustrate possible alternate routes;
    a zoom optical system for zooming in and out of said ½ km up to 1 km area of the vehicle location on a stored map;
    means for summoning help to the present location of the vehicle;
    a radar unit for sensing an object that obstructs the pre-projected pathway of the motor vehicle;
    a plurality of sensors and running control means for performing auto-drive control running of the vehicle based on detection of signals from said plurality of sensors;
    an audible alarm sounded when an object that obstructs the projected pathway of the motor vehicle is sensed;
    means for stopping said motor vehicle before reaching the object that obstructs the pathway when said system is in an auto-drive mode;
    means for providing an image of the object based on normal photography that obstructs the pathway when said system is on auto-drive mode;
    wherein said auto-drive control consists of speed control, steering and braking; and
    a switch for switching between the auto-drive and manual drive modes; and
    wherein said auto-drive control receives detection signals from said GPS navigational system detecting the position of the vehicle and determines the timing for operation of said switch according to a pre-determined shift time stored in memory required to complete the change over from an auto-drive to manual drive and judges whether or not the vehicle has reached a position where the auto-drive should be switched to manual drive and when judged that the shift cannot be completed because the vehicle is positioned when the shift to manual drive cannot be completed in time shows on said monitor that the shift to manual drive is prohibited.

* * * * *